(12) United States Patent
Sakauchi

(10) Patent No.: US 9,083,142 B2
(45) Date of Patent: Jul. 14, 2015

(54) EXCITATION LIGHT DISTRIBUTION DEVICE, EXCITATION LIGHT DISTRIBUTION METHOD, OPTICAL AMPLIFICATION SYSTEM AND NODE DEVICE

(75) Inventor: Masahiro Sakauchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 163 days.

(21) Appl. No.: 13/880,094

(22) PCT Filed: Sep. 20, 2011

(86) PCT No.: PCT/JP2011/071933
§ 371 (c)(1),
(2), (4) Date: Apr. 18, 2013

(87) PCT Pub. No.: WO2012/053320
PCT Pub. Date: Apr. 26, 2012

(65) Prior Publication Data
US 2013/0222890 A1     Aug. 29, 2013

(30) Foreign Application Priority Data

Oct. 22, 2010   (JP) ................................. 2010-237609

(51) Int. Cl.
*H01S 3/091*        (2006.01)
*H04B 10/291*      (2013.01)
(Continued)

(52) U.S. Cl.
CPC ......... *H01S 3/0912* (2013.01); *H01S 3/094049* (2013.01); *H01S 3/094061* (2013.01); *H04B 10/291* (2013.01); *H01S 3/06754* (2013.01); *H01S 3/1301* (2013.01)

(58) Field of Classification Search
CPC .................................................. H01S 3/094061
USPC ..................................................... 359/341.32
See application file for complete search history.

(56) References Cited

U.S. PATENT DOCUMENTS 4,554,510 A * 11/1985 Shaw et al. ................ 359/341.2
4,796,263 A *  1/1989 Rampolla ....................... 372/10
(Continued)

FOREIGN PATENT DOCUMENTS

JP          9-97940 A      4/1997
JP      2001-160651 A      6/2001
(Continued)

OTHER PUBLICATIONS

International Search Report of PCT Application No. PCT/JP2011/071933 mailed on Nov. 15, 2011.
(Continued)

*Primary Examiner* — Ari M Diacou
(74) *Attorney, Agent, or Firm* — Sughrue Mion, PLLC

(57) ABSTRACT

For the purpose of reducing the cost and power consumption of an optical amplification system provided with an optical amplifier, an excitation light distribution device of the present invention comprises an excitation light source output unit which outputs excitation light, an optical branching unit with variable branching ratio which branches and outputs the excitation light, and a control unit which, on the basis of information on an optical signal to be amplified by the excitation light outputted by the optical branching unit, controls at least either the branching ratio of the optical branching unit or the optical output power of the excitation light source output unit.

10 Claims, 10 Drawing Sheets

(51) Int. Cl.
    *H01S 3/094*    (2006.01)
    *H01S 3/067*    (2006.01)
    *H01S 3/13*     (2006.01)

(56)            References Cited

U.S. PATENT DOCUMENTS

| 5,138,621 | A  | * | 8/1992  | Goto et al. .................. 372/38.02 |
| 5,181,134 | A  | * | 1/1993  | Fatehi et al. .................... 398/56 |
| 5,241,414 | A  | * | 8/1993  | Giles et al. ................ 359/341.33 |
| 5,299,055 | A  | * | 3/1994  | Yoneyama ............... 359/341.33 |
| 5,406,411 | A  | * | 4/1995  | Button et al. ............ 359/341.33 |
| 5,467,219 | A  | * | 11/1995 | Ushirozawa ............. 359/341.43 |
| 5,479,424 | A  | * | 12/1995 | Sakuyama ..................... 372/26 |
| 5,539,570 | A  | * | 7/1996  | Ushirozawa ............. 359/341.44 |
| 5,561,552 | A  | * | 10/1996 | Shibuya ................... 359/341.33 |
| 5,655,036 | A  | * | 8/1997  | Webb .............................. 385/15 |
| 5,778,017 | A  | * | 7/1998  | Sato et al. .................. 372/38.02 |
| 5,802,089 | A  | * | 9/1998  | Link .......................... 372/38.02 |
| 5,900,968 | A  | * | 5/1999  | Srivastava et al. ....... 359/341.41 |
| 5,900,969 | A  | * | 5/1999  | Srivastava et al. ....... 359/341.42 |
| 6,144,487 | A  | * | 11/2000 | Michishita ................. 359/337.1 |
| 6,310,716 | B1 | * | 10/2001 | Evans et al. .................... 359/334 |
| 6,321,002 | B1 | * | 11/2001 | Kosaka et al. ................... 385/24 |
| 6,347,099 | B1 | * | 2/2002  | da Silva et al. .................... 372/6 |
| 6,373,623 | B1 | * | 4/2002  | Ohshima et al. ........... 359/341.3 |
| 6,381,065 | B1 | * | 4/2002  | Homsey ................... 359/341.32 |
| 6,384,965 | B2 | * | 5/2002  | Akiyama ................... 359/341.4 |
| 6,388,806 | B1 | * | 5/2002  | Freeman et al. ........... 359/341.3 |
| 6,400,498 | B1 | * | 6/2002  | Shimomura et al. ....... 359/341.1 |
| 6,594,046 | B1 | * | 7/2003  | Nishino ........................ 359/239 |
| 6,606,188 | B2 | * | 8/2003  | Shimojoh .................... 359/334 |
| 6,606,189 | B2 | * | 8/2003  | Akiyama ....................... 359/337 |
| 6,646,792 | B2 | * | 11/2003 | Nakamura ............... 359/341.42 |
| 7,031,051 | B2 | * | 4/2006  | Liu et al. ..................... 359/341.2 |
| 7,088,500 | B2 | * | 8/2006  | Stephens ................... 359/341.2 |
| 7,330,303 | B2 | * | 2/2008  | Sato et al. ................ 359/341.41 |
| 7,355,787 | B2 | * | 4/2008  | Charlet et al. ............. 359/341.2 |
| 7,460,298 | B2 | * | 12/2008 | Li et al. .................... 359/341.32 |
| 8,189,258 | B2 | * | 5/2012  | Rapp et al. ............... 359/341.33 |
| 8,493,652 | B2 | * | 7/2013  | Rapp et al. ............... 359/341.33 |
| 8,699,125 | B2 | * | 4/2014  | Bolshtyansky et al. .... 359/341.3 |
| 8,824,045 | B2 | * | 9/2014  | Mino ....................... 359/341.32 |
| 2001/0008459 | A1 | * | 7/2001 | Ohshima et al. ......... 359/341.44 |
| 2002/0008902 | A1 | * | 1/2002 | Akiyama ................... 359/341.4 |
| 2003/0072064 | A1 | * | 4/2003 | Ohta ............................. 359/177 |
| 2007/0003286 | A1 | * | 1/2007 | Masuda et al. ................. 398/92 |
| 2007/0115539 | A1 | * | 5/2007 | Charlet et al. ........... 359/341.32 |
| 2007/0268569 | A1 | * | 11/2007 | Muro et al. .................... 359/334 |
| 2008/0204860 | A1 | * | 8/2008 | Rapp ............................ 359/341.3 |
| 2009/0201576 | A1 | * | 8/2009 | Bolshtyansky et al. .. 359/341.33 |
| 2011/0085230 | A1 | * | 4/2011 | Rapp et al. ................. 359/341.3 |
| 2011/0116790 | A1 | * | 5/2011 | Sakauchi et al. .................. 398/5 |
| 2012/0182603 | A1 | * | 7/2012 | Rapp ............................ 359/341.3 |
| 2012/0195594 | A1 | * | 8/2012 | Sakauchi et al. ................. 398/48 |
| 2012/0218625 | A1 | * | 8/2012 | Mino ............................. 359/334 |
| 2012/0262780 | A1 | * | 10/2012 | Bai et al. .................. 359/337.11 |
| 2013/0114130 | A1 | * | 5/2013 | Stampoulidis et al. .. 359/341.32 |

FOREIGN PATENT DOCUMENTS

| JP | 2003-283019 A | 10/2003 |
| JP | 2004-78002 A  | 3/2004  |
| JP | 2008-193512 A | 8/2008  |

OTHER PUBLICATIONS

"iMS NxM Expandable Multicast Switch",[online], 2008-2013, Enablence Technologies Inc. Website, [searched on Apr. 17, 2013] on the internet. <http://www.enablence.com/components/solutions/switching-routing/integrated-switches/product/ims-nxm-expandable-multicast-switch>.

* cited by examiner

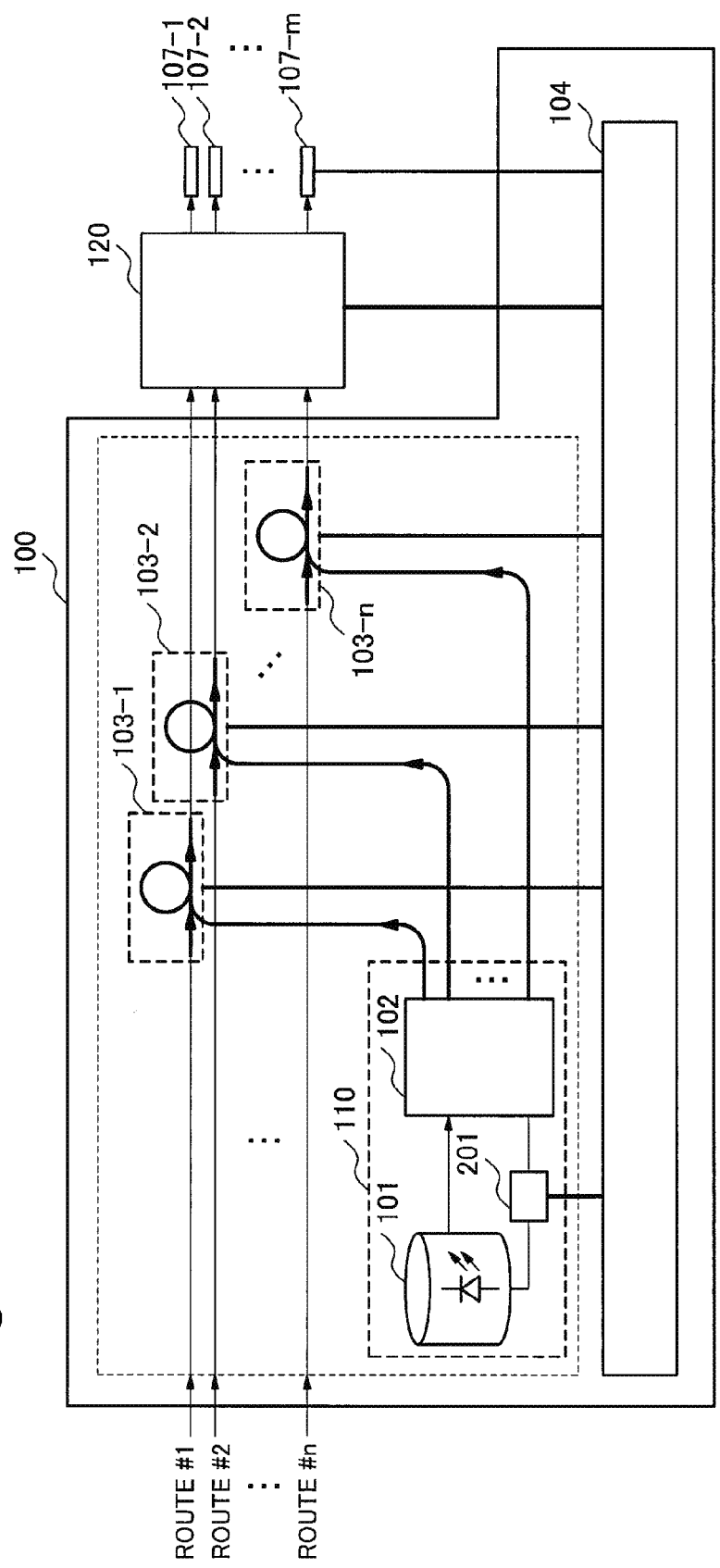

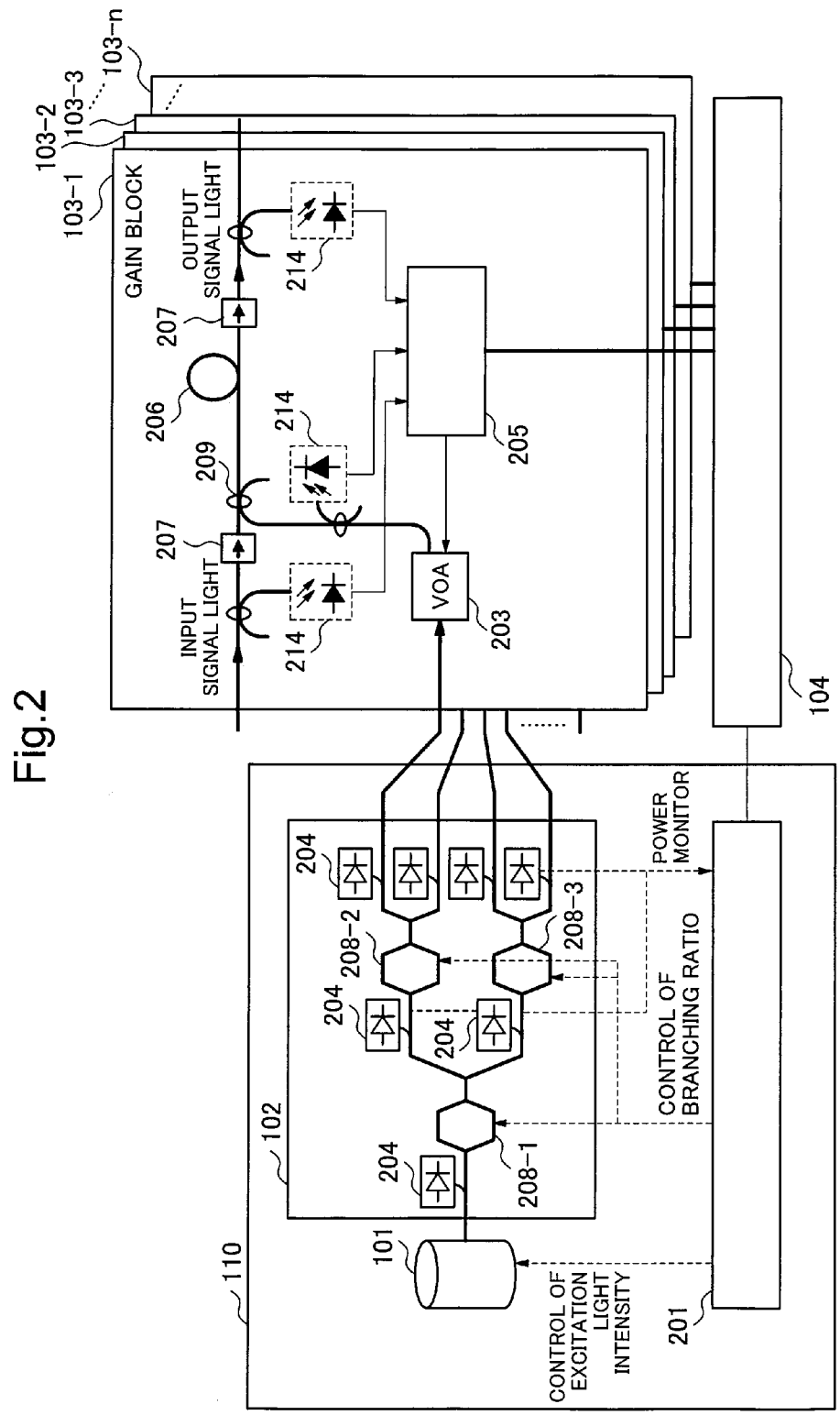

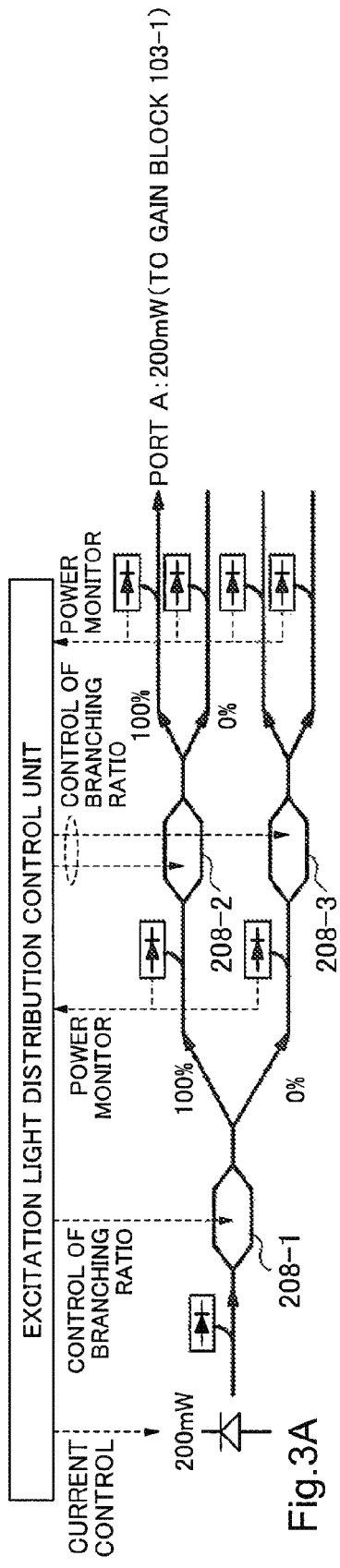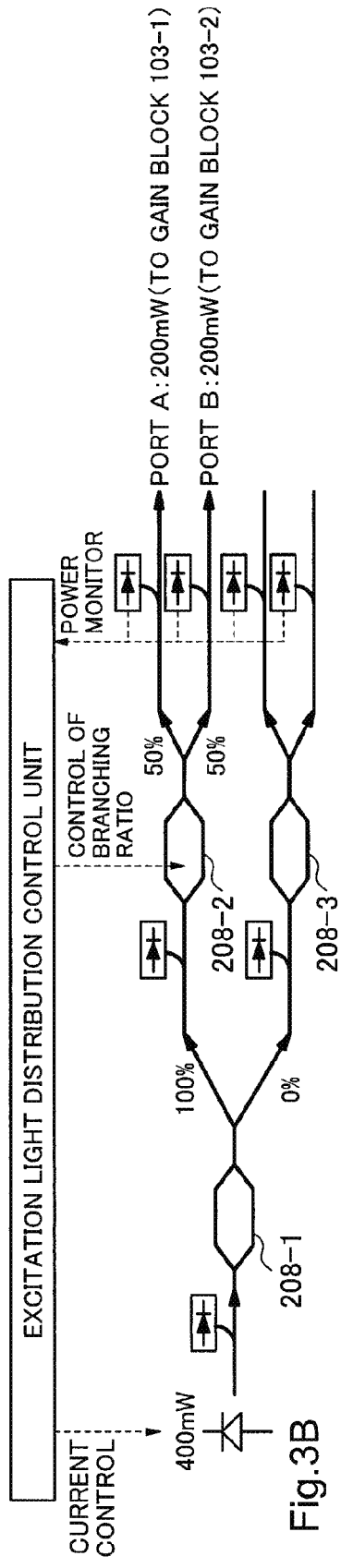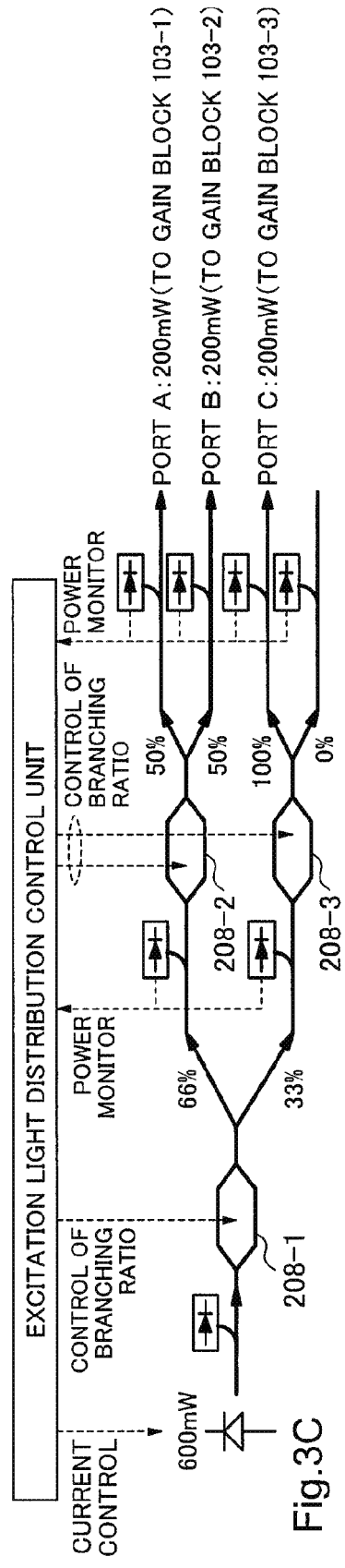

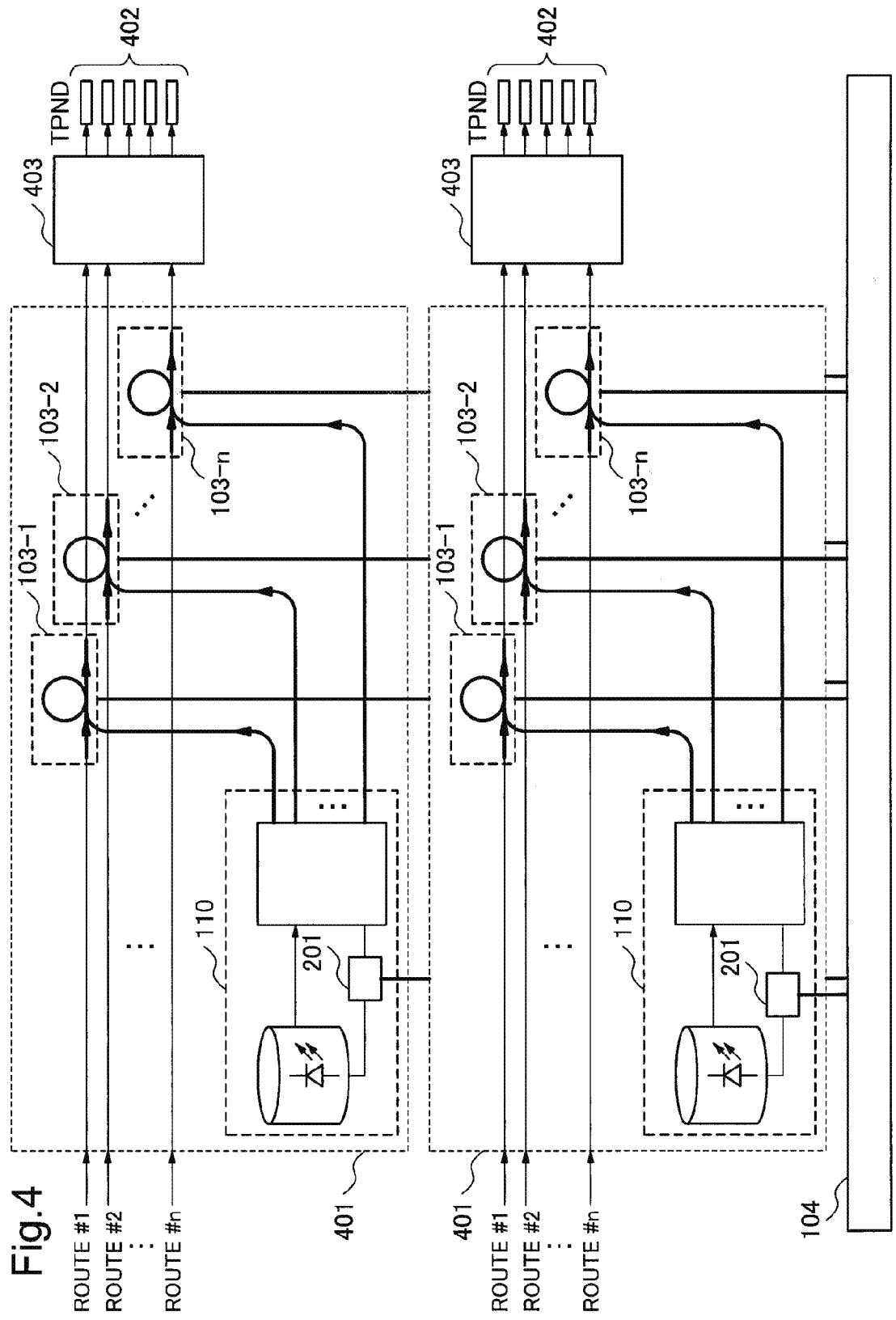

EXCITATION LIGHT DISTRIBUTION DEVICE, EXCITATION LIGHT DISTRIBUTION METHOD, OPTICAL AMPLIFICATION SYSTEM AND NODE DEVICE

This application is a National Stage Entry of PCT/JP2011/071933 filed Sep. 20, 2011, which claims priority from Japanese Patent Application 2010-237609 filed Oct. 22, 2010, the contents of all of which are incorporated herein by reference, in their entirety.

TECHNICAL FIELD

The present invention relates to an optical amplification system, and in particular, relates to an excitation light distribution system, an excitation light distribution method, an optical amplification system and a node apparatus.

BACKGROUND ART

WDM (Wavelength Division Multiplexing) and ROADM (Reconfigurable Optical Add Drop Multiplexer) systems providing large capacity point-to-point connection have been introduced into core networks of optical communication. Following that, introduction of WDM and ROADM systems into metro and regional networks is also in progress.

In a node of a ROADM system, an optical path between a transponder disposed within the node or connected to the node and a route connected to the transponder is connected by any optional path and with any optional wavelength. That is, a ROADM node is provided with a function to connect an optical signal of a specific wavelength, among the wavelengths in a wavelength-multiplexed optical signal which is transmitted and received via a plurality of transmission lines, to a specific transponder.

FIG. 6 is a diagram showing one form of a ROADM network relevant to the present invention.

A ROADM node 601 is connected with other ROADM nodes 603 and 604 via respective ones of a plurality of optical fiber transmission lines 602. Then, the ROADM node 601 is controlled at each wavelength of an optical signal transmitting therein to perform transmission and reception of an optical signal to and from the other ROADM nodes 603 and 604.

Further, the ROADM node 601 combines optical signals transmitted by the optical transmitters of transponders 606 into a wavelength-multiplexed optical signal and sends out the optical signal to the optical fiber transmission lines 602. Receiving the wavelength-multiplexed light, the other ROADM nodes facing the ROADM node 601 wavelength-demultiplex the received light. Then, the optical receivers of transponders connected to respective ones of the other ROADM nodes receive the wavelength-demultiplexed optical signals.

FIG. 7 is a diagram for illustrating in more detail a configuration of the ROADM node 601 shown in FIG. 6. In FIG. 7, the ROADM node 601 comprises a wavelength path-line add/drop unit 723, transponder accommodation units 721 and 722, and a control unit 732.

The wavelength path-line add/drop unit 723 drops only an optical signal of a predetermined wavelength among wavelength-multiplexed optical signals received from transmission lines 701, and outputs the optical signal of the predetermined wavelength to the transponder accommodation unit 721. The wavelength path-line add/drop unit 723 and the transponder accommodation unit 721 are connected with each other by a plurality of routes 761.

Further, the wavelength path-line add/drop unit 723 adds to transmission lines 711 a wavelength-multiplexed optical signal which is output by the transponder accommodation unit 722. The wavelength path-line add/drop unit 723 and the transponder accommodation unit 722 are connected with each other by a plurality of routes 771.

The number of optical signal wavelengths included in the routes 761 and that in the routes 771 vary in accordance with the operating state of the ROADM node 601.

The transponder accommodation unit 721 connects the routes 761 and the transponders 751 such that a predetermined one among one or more transponders 751 receives an optical signal dropped from the transmission lines 701.

The transponder accommodation unit 722 connects the routes 771 and the transponders 751 such that an optical signal transmitted by the transponders 751 is added to a predetermined one among the transmission lines 711.

Here, the transmission lines 701 and 711 in FIG. 7 correspond to the optical fiber transmission lines 602 in FIG. 6.

The control unit 732 controls each unit of the ROADM node 601. Specifically, the control unit 732 controls the wavelength path-line add/drop unit 723 such that an optical signal to be a target of drop or add, among wavelength-multiplexed optical signals transmitted via the transmission lines 701 and 711, is connected to the transponder accommodation units 721 or 722.

Also, the control unit 732 controls the transponder accommodation unit 721 such that an optical signal dropped from the wavelength path-line add/drop unit 723 is received by a predetermined one among the transponders 751.

Further, the control unit 732 controls the transponder accommodation unit 722 such that optical signals transmitted by the transponders 751 are added, in the wavelength path-line add/drop unit 723, to respective predetermined ones of the transmission lines 711.

As an optical device provided with a function to connect any optional route with an optional transponder, which is required of the transponder accommodation units 721 and 722, there is mentioned a multicast switch described in Non-patent Document 1. Non-patent Document 1 describes a multicast switch which can connect eight transponders to four routes.

FIG. 8 is a diagram showing a configuration of a transponder accommodation unit employing a multicast switch, which is relevant to the present invention. In FIG. 8, for simple description, a case where four transponders (TPND) 804-1 to 804-4 are connected to a transponder accommodation unit 806 is illustrated.

The transponder accommodation unit 806 illustrated in FIG. 8 comprises a multicast switch 805 and variable wavelength filters 803-1 to 803-4. The multicast switch 805 comprises 1×4 splitters 801-1 to 801-4 and 4×1 switches 802-1 to 802-4. Here, the multicast switch 805 is different from the multicast switch described in Non-patent Document 1 in that the number of transponders possible to connect to it is four. However, basic operation of the multicast switch 805 illustrated in FIG. 8 is the same as that of the multicast switch described in Non-patent Document 1.

In FIG. 8, wavelength-multiplexed light is inputted from routes #1 to #4 to the transponder accommodation unit 806. The wavelength-multiplexed light inputted to the transponder accommodation unit 806 is split into four branches by the 1×4 splitters 801-1 to 801-4 comprised in the multicast switch 805. Then, the branches of the wavelength-multiplexed light are inputted to the 4×1 switches 802-1 to 802-4. The multicast switch 805 comprises the same number of 4×1 switches as the number of transponders connected to the multicast switch. In FIG. 8, since the number of transponders connected to the multicast switch 805 is four, the multicast switch 805 comprises four 4×1 switches.

The 4×1 switches 802-1 to 802-4 each select any one of optical paths inputted from respective ones of the 1×4 splitters 801-1 to 801-4 and connect the selected optical path with the corresponding one of the variable wavelength filters 803-1 to 803-4. As the result, wavelength-multiplexed light outputted from the 1×4 splitter connected to the selected optical path is outputted to the variable wavelength filter via the 4×1 switch.

The transmissive wavelengths of the variable wavelength filters 803-1 to 803-4 are each set to be coincident with the respective wavelengths of light to be received by the respective transponders which are connected to the variable wavelength filters. As a result of the operation of the variable wavelength filters 803-1 to 803-4, the transponders 804-1 to 804-4 each can extract and receive only light of a desired wavelength among a plurality of light components of different wavelengths included in the wavelength-multiplexed light.

In the configuration illustrated in FIG. 8, branching loss and transmission loss occur respectively in the 1×4 splitters 801-1 to 801-4 and in the 4×1 optical switches 802-1 to 802-4. For the purpose of compensating such losses, a configuration of disposing an optical amplifier on each route is considered.

FIG. 9 is a diagram showing a configuration where an optical amplifier is arranged on each route connected to the transponder accommodation unit. In FIG. 9, optical amplifiers for loss compensation 907-1 to 907-4 are arranged on the respective routes of the transponder accommodation unit 806 shown in FIG. 8. The optical amplifiers 907-1 to 907-4 are typically optical fiber amplifiers using an optical fiber doped with a rare-earth element as an amplification medium. The optical amplifiers 907-1 to 907-4 each includes an optical fiber being an amplification medium and an excitation light source inside, and controls their output levels or gains by controlling the output power of the respective excitation light sources.

It is assumed that the transponder accommodation unit 806 accommodates four wavelengths with respect to each route and deals with four routes. There, on all of the routes #1 to #4 connected to the transponder accommodation unit accommodating four transponders, optical amplifiers 907-1 to 907-4 are disposed respectively.

In the configuration shown in FIG. 9, the number of wavelengths amplified by one optical amplifier depends on status of transponders usage, that is, status of route and wavelength selections during operation, and accordingly takes a minimum value of zero and a maximum value equivalent to the number of accommodated transponders. For example, when the number of transponders is four, the maximum amplification performance required of one optical amplifier is that for amplifying four wavelengths, which corresponds to the case of using all of the transponders for one route. On the other hand, in practical operation, it is usually the case that only optical signals of the wavelengths to be received actually by the transponders are inputted from the routes #1 to #4 to the transponder accommodation unit 806 via the optical amplifiers 907-1 to 907-4. That is, there are some cases that four wavelengths are not amplified in each of the optical amplifiers 907-1 to 907-4 simultaneously.

Further Japanse Patent Application Laid-Open No. 2003-283019 relevant to the present invention describes a configuration of distributing excitation light by the use of a variable splitter and using the distributed light components respectively for different optical amplification means.

DISCLOSURE OF INVENTION

Technical Problem

However, the transponder accommodation unit shown in FIG. 9 has the following problems.

The first problem is that the cost per wavelength in operation (that is, the number of wavelengths whose amplification is necessary) is high.

It is because, even when it is not necessary to amplify the same number of wavelengths as the number of transponders by one optical amplifier, the capability of amplifying an optical signal including at least the same number of wavelengths as the number of transponders is required of the optical amplifiers arranged on the respective optical paths. A high-performance optical amplifier requires a high power excitation light source and low loss optical components, and these components give rise to cost increase of the optical amplifier.

The second problem is that power consumption and standby power of a ROADM node are high.

It is because, in order to realize high-speed wavelength setting and switching, regardless of the number of and the presence or absence of wavelengths to be amplified, a temperature control function needs to be operated constantly so as to stabilize oscillation wavelengths of excitation lasers of all optical amplifiers at respective predetermined wavelengths. In this case, because the number of excitation lasers increases with increasing the number of optical amplifiers, power consumption of a control circuit of an excitation laser for each optical amplifier also increases with that.

Objective of Invention

The objective of the present invention is to provide a technology for solving a problem of reducing the cost and power consumption of an optical amplification system provided with optical amplifiers.

Solution to Problem

An excitation light distribution device of the present invention comprises an excitation light source output means which outputs excitation light, an optical branching means with a variable branching ratio which branches and outputs the excitation light, and a control means which, on the basis of information on an optical signal to be amplified by the excitation light outputted by the optical branching means, controls at least either the branching ratio of the optical branching means or the optical output power of the excitation light source output means.

An excitation light distribution method of the present invention comprises outputting excitation light, branching and outputting the excitation light and, on the basis of information on an optical signal to be amplified by the excitation light branched and then outputted, controlling at least either the branching ratio of the excitation light and the optical output power of the excitation light.

Advantageous Effects of Invention

The present invention has the effect of reducing the cost and power consumption of an optical amplification system provided with optical amplifiers.

BRIEF DESCRIPTION OF THE DRAWINGS

[FIG. 1] A diagram showing a configuration of an optical amplification system of a first exemplary embodiment of the present invention

[FIG. 2] A diagram showing a more detailed configuration of the optical amplification system of the first exemplary embodiment

[FIG. 3A] A diagram showing an operation of an excitation light distribution unit of the optical amplification system of the first exemplary embodiment

[FIG. 3B] A diagram showing an operation of the excitation light distribution unit of the optical amplification system of the first exemplary embodiment

[FIG. 3C] A diagram showing an operation of the excitation light distribution unit of the optical amplification system of the first exemplary embodiment

[FIG. 4] A diagram showing a configuration of an optical amplification system of a second exemplary embodiment of the present invention

DESCRIPTION OF EMBODIMENTS

[First Exemplary Embodiment]

Figure 5:
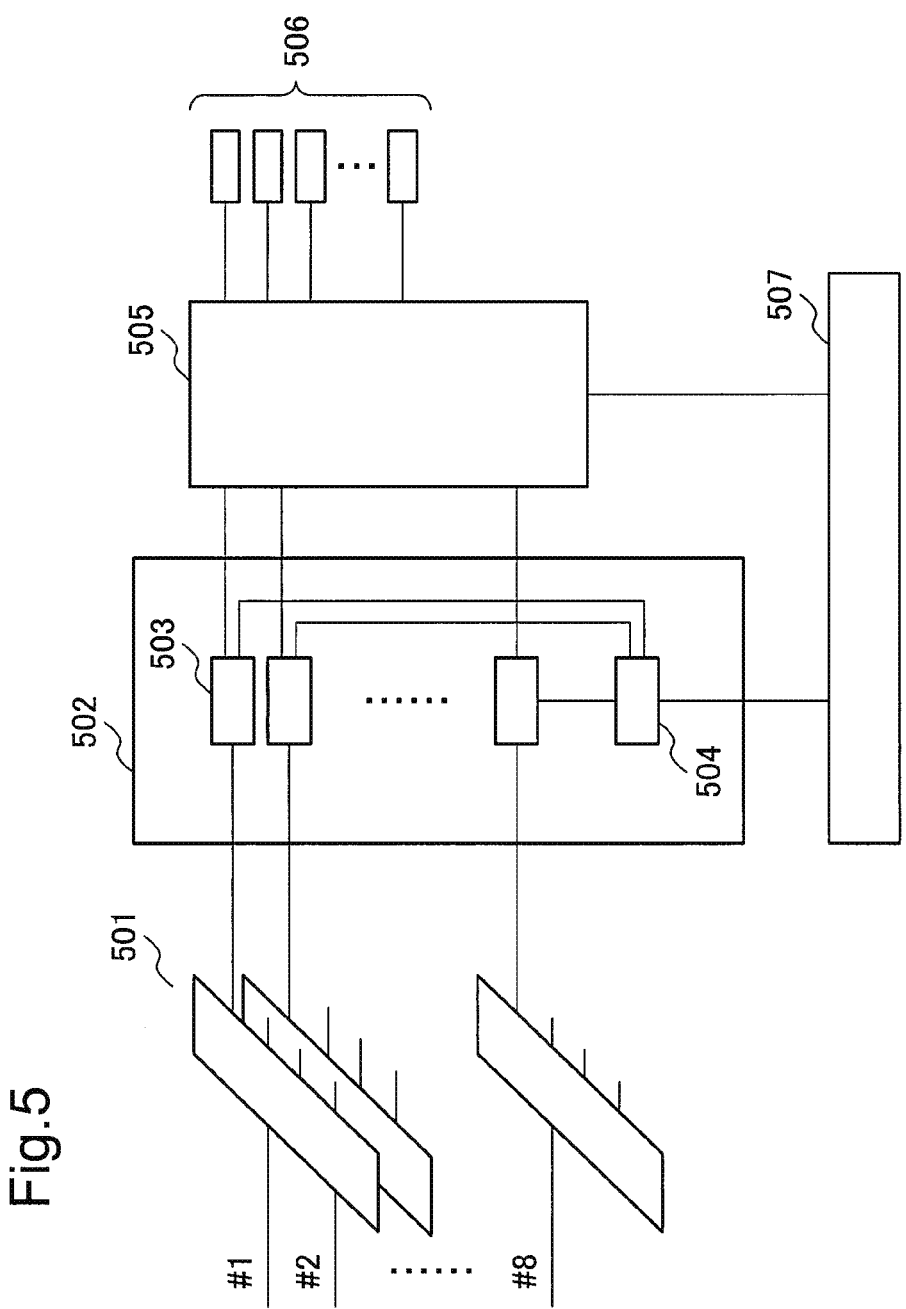
[FIG. 5] A diagram showing a configuration of an optical amplification system of a third exemplary embodiment of the present invention
Figure 6:
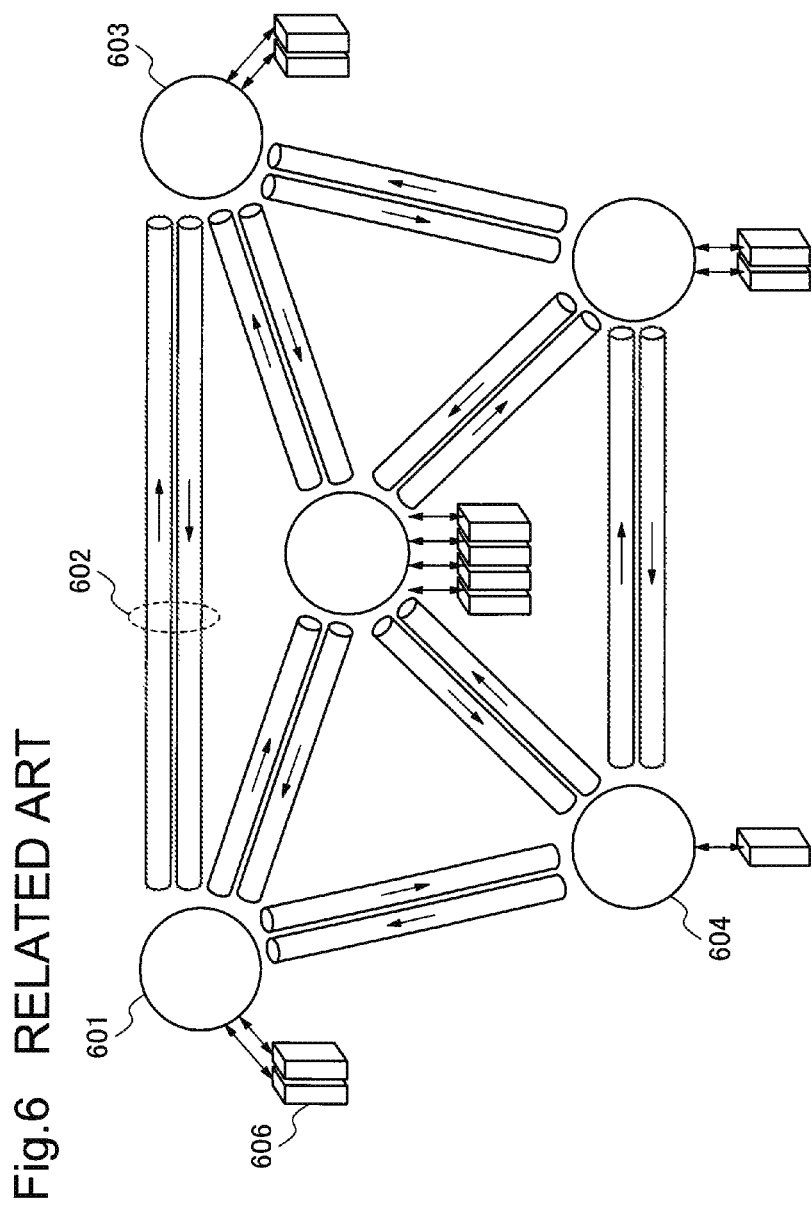
[FIG. 6] A diagram showing one form of a ROADM network relevant to the present invention

Next, detailed description will be given of embodiments of the present invention with reference to drawings.

FIG. 1 is a diagram showing a configuration of an optical amplification system of a first exemplary embodiment of the present invention. FIG. 1 also shows a configuration of a connection between an optical amplification system 100 and a transponder accommodation unit 120.

In FIG. 1, n routes consisting of routes #1 to #n are connected to the optical amplification system 100. Output of the optical amplification system 100 is inputted to the transponder accommodation unit 120.

In FIG. 1, the optical amplification system 100 includes an excitation light distribution unit 110, gain block units 103-1 to 103-n and a node device control unit 104. The excitation light distribution unit 110 includes an excitation laser light source unit 101, a variable branching unit 102 and a excitation light distribution control unit 201.

The excitation laser light source unit 101 includes an excitation laser which generates excitation light for optical amplification supplied to the gain block units 103-1 to 103-n. The excitation laser light source unit 101 may be configured by a single excitation laser, and may also be of a configuration where outputs of a plurality of excitation lasers are outputted after being combined by an optical coupler or the like.

The variable branching unit 102 branches excitation light outputted by the excitation laser light source unit 101 and distributes the branched light to the gain block units 103-1 to 103-n.

The excitation light distribution control unit 201 controls the excitation laser light source unit 101 and the variable branching unit 102 on the basis of instructions given by the node device control unit 104.

The gain block units 103-1 to 103-n are provided in a manner to correspond to the routes #1 to #n, respectively, and the gain block units each combine the excitation light distributed from the variable branching unit 102 and an optical signal inputted from the corresponding route by the use of a coupler and then amplify the optical signal with an amplification medium. Then, the gain block units 103-1 to 103-n each output the amplified optical signal to the transponder accommodation unit 120. As an example of the amplification medium, there is mentioned an EDF (Erbium doped fiber).

Figure 7:
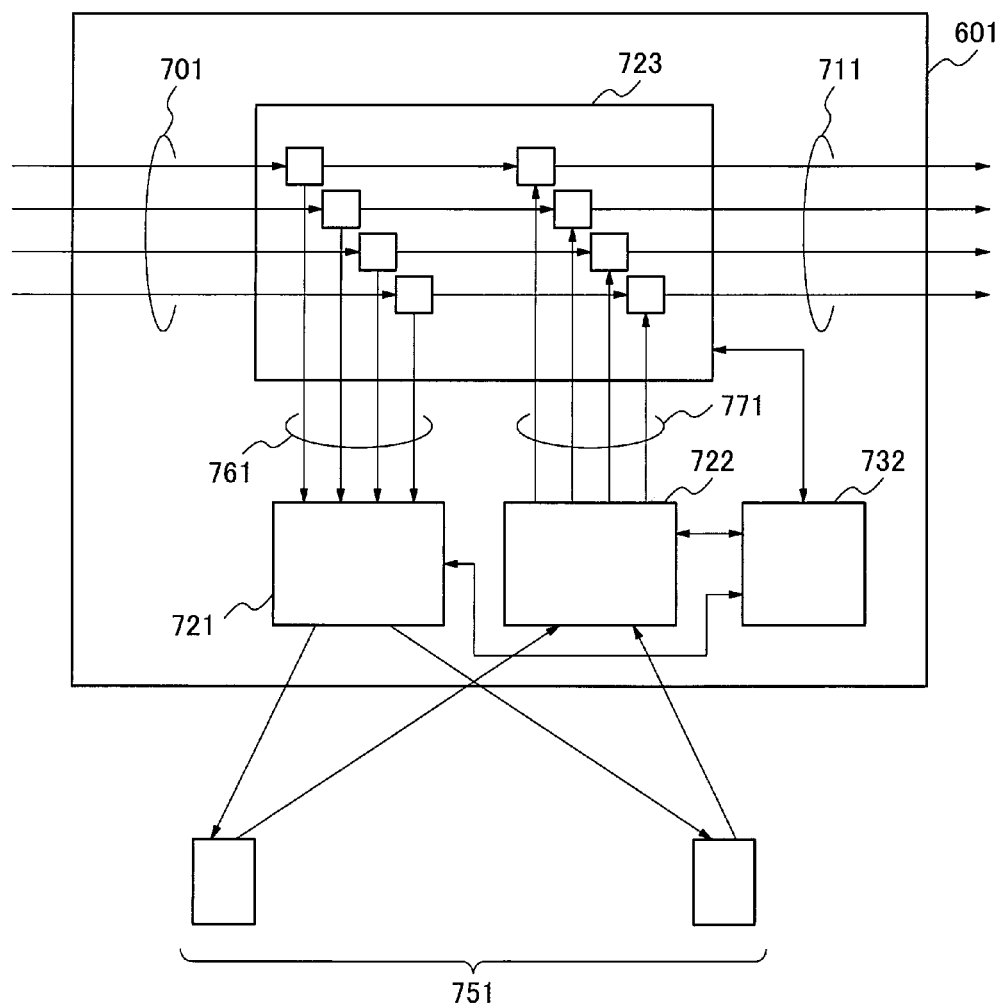
[FIG. 7] A diagram for illustrating a configuration of a ROADM node in more detail

The transponder accommodation unit 120 is provided with a function corresponding to that of the transponder accommodation unit 721 illustrated in FIG. 7. That is, the transponder accommodation unit 120 sets the optical paths such that optical signals included in wavelength-multiplexed light inputted from the optical amplification system 100 are each received by any one of n transponders 107-1 to 107-m (m: a positive integer) separately at each wavelength. The transponder accommodation unit 120 may be configured to comprise, for example, the multicast switch and the variable wavelength filter shown in FIG. 8.

The node device control unit 104 controls the transponder accommodation unit 120. For example, when the transponder accommodation unit 120 has the same configuration as that of the transponder accommodation unit 806 shown in FIG. 8, the node device control unit 104 controls the 1×4 optical switches 802-1 to 802-4 and the variable wavelength filters 803-1 to 803-4. Specifically, the node device control unit 104 controls the transponder accommodation unit 120 such that an optical signal of a predetermined wavelength is received by a predetermined transponder.

Figure 8:
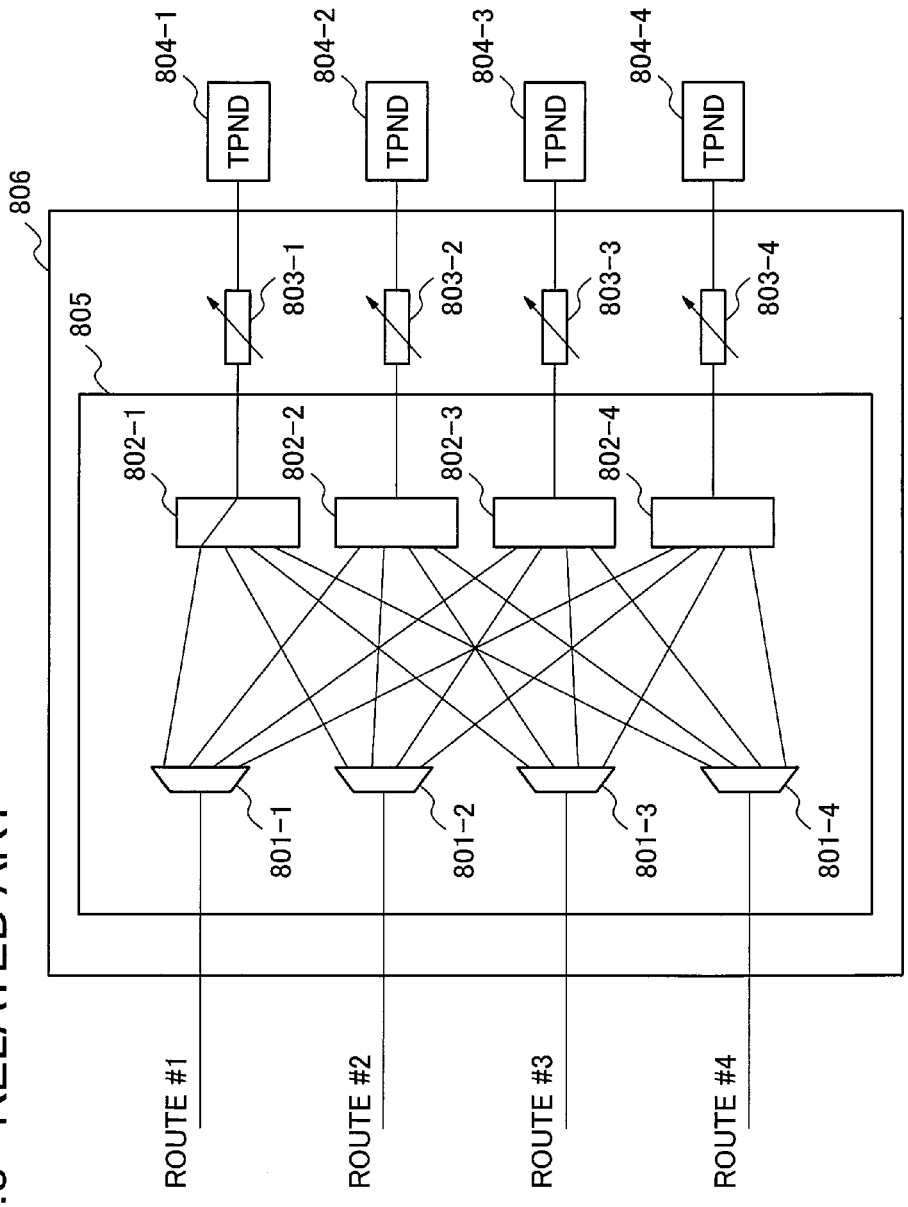
[FIG. 8] A diagram showing a configuration of a transponder accommodation unit employing a multicast switch, which is relevant to the present invention
Figure 9:
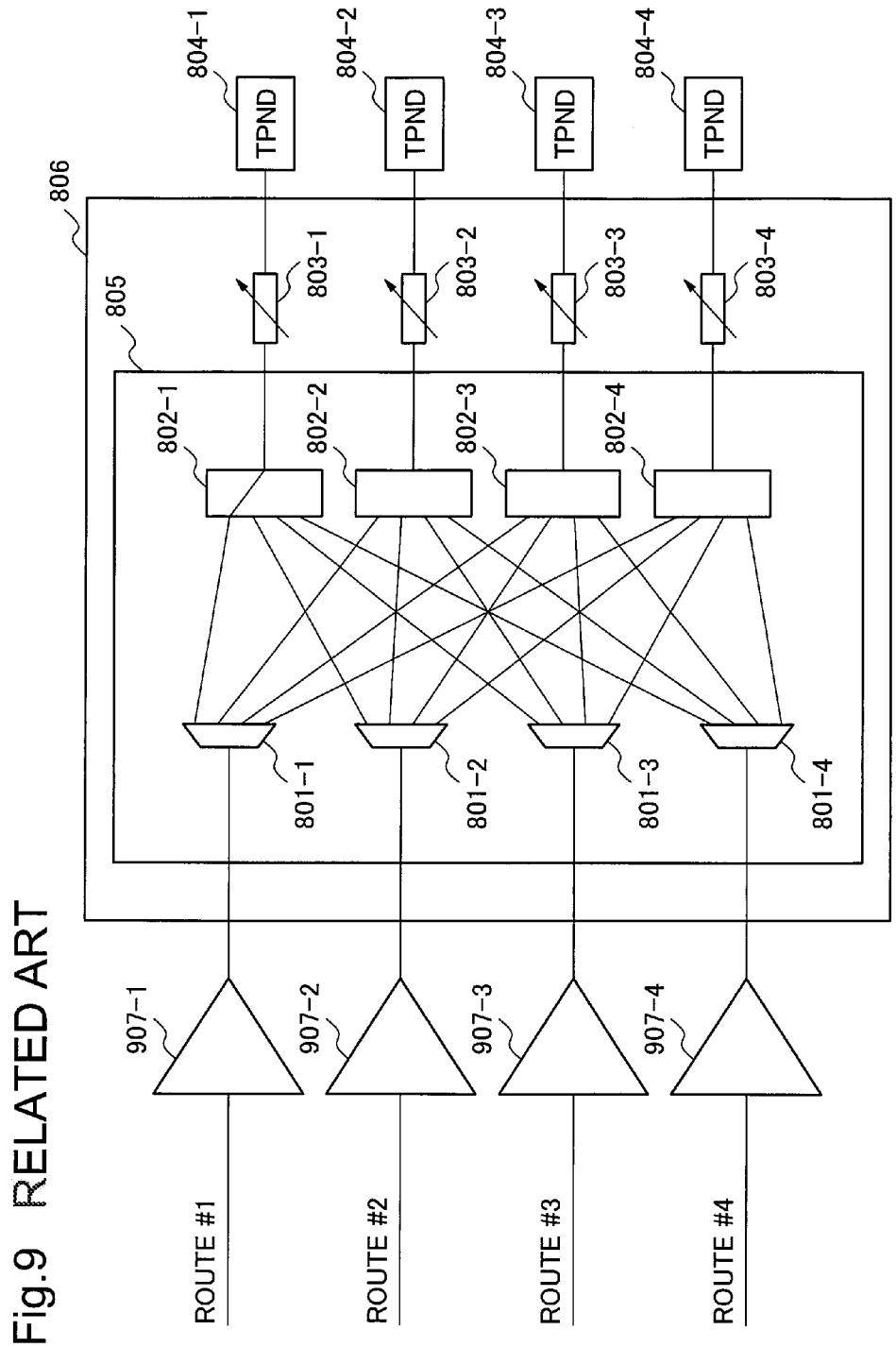
[FIG. 9] A diagram showing a configuration where optical amplifiers are disposed on routes connected to a transponder accommodation unit

Here, a configuration of the transponder accommodation unit 120 is not limited to the configuration illustrated in FIG. 8, and may be any configuration capable of receiving wavelength-multiplexed light from a plurality of routes, dropping an optical signal of a predetermined wavelength and then connecting the signal of the predetermined wavelength to a predetermined transponder.

The configuration of the optical amplification system will be described in more detail using FIG. 2. FIG. 2 is a diagram showing a more detail configuration of the optical amplification system of the first exemplary embodiment.

In FIG. 2, the variable branching unit 102 comprises optical distributors 208-1 to 208-3 and photodetectors 204.

The optical distributors 208-1 to 208-3 splits inputted light into two branches. Respective branching ratios of the optical distributors 208-1 to 208-3 can be varied under the control of the excitation light distribution control unit 201. Such an optical distributor is realized by, for example, a configuration where a Mach-Zehnder interferometer is formed on an optical waveguide. Because the principle and configuration of an optical distributor using a Mach-Zehnder interferometer are known well, their detailed description will be omitted here.

The excitation light distribution unit 110 in FIG. 2 is shown, as an example, to be a configuration for a case excitation light is split into four branches. Practically, in the variable branching unit 102, the optical distributors are configured to be able to split excitation light into the same number of branches as the number of gain blocks. In the configuration for splitting excitation light into four branches shown in FIG. 2, three optical distributors 208-1 to 208-3 are used. In general, by connecting $2^n - 1$ optical distributors 208 in a tree structure, excitation light can be split into $2^n$ branches.

The photodetector 204 monitors optical power at respective section of optical path in the variable branching unit 102, by causing part of an optical signal to branch by the use of a coupler and then detecting the intensity of the branch optical signal with a photodiode. The variable branching unit 102 comprises a plurality of photodetectors 204, all of which have the same configuration.

The gain block units 103-1 to 103-n each comprise an active fiber 206, isolators 207, photodetectors 214, a variable optical attenuator (VOA) 203, an individual gain block control unit 205 and optical couplers 209.

The active fiber 206 is an optical fiber which is amplification medium when an optical signal is amplified by excitation light, and is, for example, an EDF (Erbium doped fiber). The isolators are employed in order to prevent performance degradation or oscillation of an optical amplifier caused by reflected light. The position and the number of the isolators in FIG. 2 are just an example, and the position and the number of the isolators may be changed depending on design conditions of an optical amplifier.

The photodetectors 214 each detect, with a photodiode, the intensity of the optical signal branched by a coupler, similarly to the photodetector 204 comprised in the variable branching unit 102. The gain block units 103-1 to 103-n each include a plurality of photodetectors 214, all of which have the same configuration. By this way, the photodetectors 214 monitor optical power at respective sections of optical paths in each of the gain block units 103-1 to 103-n.

Optical power monitoring information is inputted from the photodetectors 214 for optical power monitoring to the individual gain block control unit 205.

[Description of Operation]

Operation of the exemplary embodiment of the present invention will be described using FIGS. 1 and 2.

In FIG. 1, the node device control unit 104 holds information on connection setting between the routes #1 to #n, the transponder accommodation unit 120 and the transponders 107-1 to 107-m.

Description will be given below of a case where the transponder accommodation unit 120 is controlled by the node device control unit 104 such that the transponder 107-1 receives an optical signal of wavelength λ1 (lambda 1) inputted from the route #1. In this case, on the basis of the connection setting information stored in itself, the node device control unit 104 specifies that a gain block to be operated when the transponder 107-1 receives an optical signal is the gain block 103-1.

In order to supply excitation light power to the thus specified gain block 103-1, the node device control unit 104 specifies an output port of the variable branching unit 102 to output the excitation light. It also calculates excitation light power required for amplifying the signal of wavelength λ1 (lambda 1). Further, the node device control unit 104 notifies the excitation light distribution control unit 201 of information on the specified output port of the variable branching unit 102 and of the calculation result on excitation light power.

The excitation light distribution control unit 201 controls the excitation laser light source unit 101 and the variable branching unit 102 such that excitation light of the calculated power is outputted from the specified excitation light output port. In the variable branching unit 102, the optical distributors 208-1 to 208-3 control their own branching ratios according to instructions given by the excitation light distribution control unit 201.

The photodetectors 204 monitor optical power at respective sections of the variable branching unit 102 and output the results to the excitation light distribution control unit 201. On the basis of the monitoring results of the photodetectors 204, the excitation light distribution control unit 201 controls respective branching ratios of the variable branching ratio optical distributors 208 such that excitation light is outputted from only the specified excitation light output port.

Here, when an optical signal is inputted via only the route #1 to the optical amplification system 100, it is only necessary to control respective branching ratios of the variable branching ratio optical distributors 208 such that excitation light is outputted to only the gain block 103-1. Operation of the excitation light distribution unit will be described later using FIGS. 3A to 3C.

Next, description will be given of operation of the gain block 103-1 which is supplied with excitation light power from the excitation light distribution unit 110, using FIG. 2.

Excitation light supplied from the variable branching unit 102 is inputted to the VOA 203 included in the gain block 103-1. Output power from the VOA 203 is combined with an input optical signal by the optical coupler 209, and the combined signal is inputted to the active fiber 206, and the input optical signal is thereby amplified.

The individual gain block control unit 205 controls the VOA 203 on the basis of monitoring information of the photodetectors 214 at respective sections. By controlling the VOA 203, the individual gain block control unit 205, in each gain block, can change excitation light power inputted to the active fiber 206. By thus changing excitation light power, the individual gain block control unit 205 can perform Automatic Gain Control (AGC) between input and output optical signals of the gain block 103-1. Alternatively, the individual gain block control unit 205 may perform Automatic Level Control (ALC; or Automatic Power Control, APC).

Here, the node device control unit 104 may hold parameters of the AGC control or ALC control of the gain block 103-1. Further, the individual gain block control unit 205 may control the VOA 203 on the basis of the parameters received by communication with the node device control unit 104. As parameters of the AGC control or ALC control, there are mentioned the gains and the upper and lower limit values of output power of the respective gain blocks, but the parameters are not limited to these.

The configuration of the gain block 103-1 shown in FIG. 2 may be similarly held also by the other gain blocks 103-2 to 103-n. Accordingly, by the gain blocks 103-1 to 103-n each comprising the variable optical attenuator 203, the photodetectors 214 and the individual gain block control unit 205, feedback control closed within each of the gain blocks 103-1 to 103-n becomes possible. As a result of that the feedback control is performed in a closed loop within each gain block, extremely fast AGC control or ALC control becomes possible in each of the gain blocks 103-1 to 103-n.

FIGS. 3A to 3C are diagrams showing operation of the excitation light distribution unit of the optical amplification system of the first exemplary embodiment. FIG. 3A shows a configuration of the variable branching unit 102 of when excitation light is outputted to only one gain block (the gain block 103-1). In FIG. 3A, in the variable branching unit 102 employing the three optical distributors 208-1 to 208-3, the excitation light distribution control unit 201 controls the optical distributors 208-1 and 208-2 to cause excitation light to branch by 100% into the side of the optical path connected to the gain block 103-1. As a result, when the optical output power of the excitation laser light source is 200 mW, if transmission losses in the optical distributors 208 are neglected, 200 mW of excitation light power is outputted entirely to a port A.

Next, description will be given of operation in a case an optical signal of wavelength λ2 (lambda 2) is further added onto the same route as that of an optical signal of wavelength λ1 (lambda 1).

In order to supply excitation light power to the gain block 103-1, the node device control unit 104 specifies, to the excitation light distribution control unit 201, a port from which the variable branching unit 102 needs to output the excitation light. Also, the node device control unit 104 calculates excitation light power required for amplifying both an optical signal of wavelength λ1 (lambda 1) and that of λ2 (lambda 2), and then notifies the excitation light distribution control unit 201 of information on the specified output port of the variable branching unit 102 and of the calculation result of the excitation light power.

In this case, because only a signal of a different wavelength is added onto the same route, the excitation light distribution control unit 201 only increases the required excitation light power without changing the output port of excitation light. That is, the excitation light distribution control unit 201 does not change the branching ratio of the variable branching unit 102 keeping the branching ratio at the state shown in FIG. 3A. Then, the excitation light distribution control unit 201 controls the excitation laser light source unit 101 to output the predetermined excitation light power, in accordance with instructions given by the node device control unit 104. For example, the excitation light distribution control unit 201 increases the excitation light power, which is 200 mW in FIG. 3A, to 400 mW. The rest of the operation is the same as that in the case of wavelength λ1 (lambda 1) already described above.

Next, using FIGS. 3B and 3C, description will be given of operation of the excitation light distribution control unit 201 in a case a plurality of gain blocks are operated.

Assumed is a case where, in a situation the gain block 103-1 amplifies an optical signal of wavelength λ1 (lambda 1) inputted from the route #1, another optical signal of wavelength λ1 (lambda 1) is additionally inputted via the route #2 and received by the transponder 107-2. In this case, the gain block 103-2 comes to amplify the optical signal of wavelength λ1 (lambda 1) inputted via the route #2. Here, the wavelength of an optical signal inputted via the route #2 does not need to be λ1 (lambda 1), and may be another wavelength.

The node device control unit 104 remembers, as connection setting information, that an optical signal inputted via the route #2 is to be connected to the transponder 107-2 via the transponder accommodation unit 120. From this connection setting information, the node device control unit 104 specifies that a gain block to be operated newly is the gain block 103-2. Then, in order to supply excitation light power to the specified gain block 103-2, the node device control unit 104 specifies, to the excitation light distribution control unit 201, a port of the variable branching unit 102 from which the excitation light needs to be outputted. Further, the node device control unit 104 calculates excitation light power required for amplification of the signal of wavelength λ1 (lambda 1) by the gain block 103-2. Then, the node device control unit 104 notifies the excitation light distribution control unit 201 of information on the specified excitation light output port and of the calculation result on the excitation light power.

The excitation light distribution control unit 201 controls the excitation laser light source unit 101 and the variable branching unit 102 such that the predetermined excitation light power is outputted at the newly specified excitation light output port. The variable branching unit 102 controls respective branching ratios of the variable branching-ratio optical dividers 208 such that the excitation light power is outputted at the specified excitation light output port, using monitoring results on optical power by the photodetectors 204 for optical power monitoring.

The excitation light distribution unit 110 supplies respective predetermined levels of excitation light power to the gain blocks 103-1 and 103-2 by controlling the excitation laser light source unit 101 and the variable branching unit 102.

In this case, it is desirable that an optical signal on the route #1 is influenced only a little when the optical amplification system 100 supplies excitation light power newly to the gain block 103-2. For that purpose, the optical amplification system 100 may supply predetermined excitation light power newly to the gain block 103-2, while keeping the excitation light power already having been being supplied to the gain block 103-1.

More specifically, the excitation light distribution unit 110 monitors excitation light output power to each of the gain blocks in the variable branching unit 102, and thereby controls the excitation light power at the excitation laser light source unit 101 and the branching ratios in the variable branching unit 102.

FIG. 3B shows a configuration of the variable branching unit 102 in a case excitation light is outputted to two gain blocks (the gain blocks 103-1 and 103-2). In FIG. 3B, the excitation light distribution control unit 201 is assumed to have a configuration where the gain blocks 103-1 and 103-2 are connected to output ports A and B of the variable branching unit 102, respectively. Then, the excitation light distribution control unit 201 controls the optical distributor 208-2 to branch 50% of excitation light to each of the ports A and B.

Figure 10:
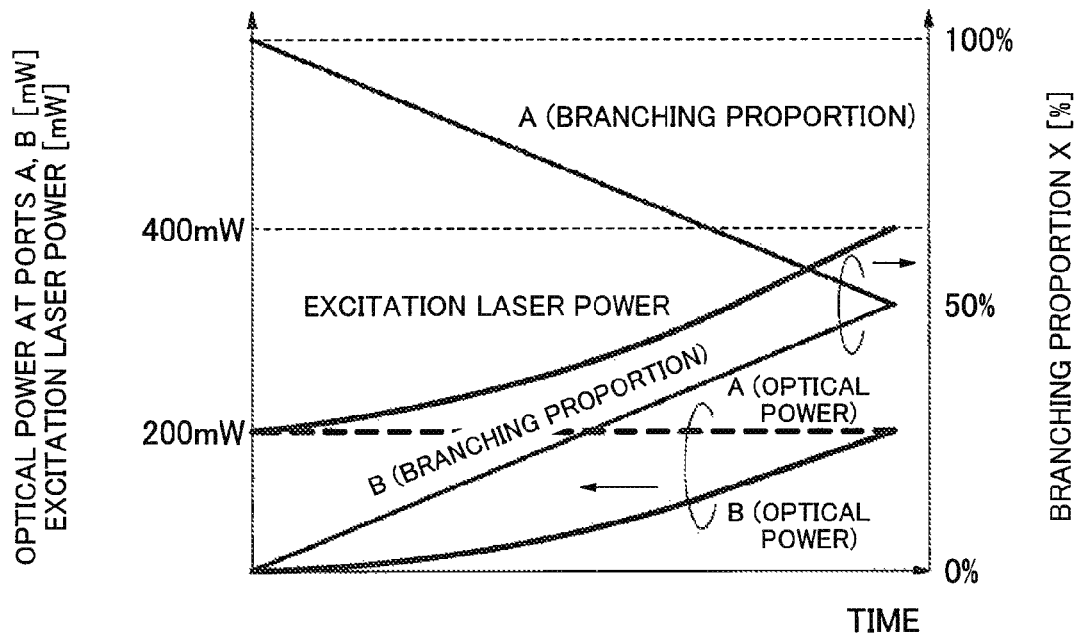
[FIG. 10] A diagram showing temporal variation of excitation light power values and of branching proportions of an optical distributor during addition of a gain block

FIG. 10 is a diagram showing change of excitation light and that of the branching ratio of the optical distributor 208-2 during a period of increasing the number of gain blocks in operation. In FIG. 10, when starting supply of excitation light power to the gain block 103-2, in addition to increasing the excitation light power of the excitation laser light source unit 101, the branching proportion to the port A of the optical distributor 208-2 in FIG. 3B is decreased and that to the port B is increased.

Here, by changing the excitation light power and the branching ratio of the optical distributor 208-2 while keeping constant the product of the branching proportion to the port A of the optical distributor 208-2 and the excitation light power inputted to the optical distributor 208-2, the excitation light power outputted from the port A is kept constant. As a result, it becomes possible to supply excitation light power newly to the gain block 103-2 without changing the excitation light power to the gain block 103-1. Finally, as shown in FIG. 3B, the optical output of the excitation laser light source unit 101 is increased from 200 mW to 400 mW, and the branching ratio of the optical distributor 208-2 becomes 50%:50%. Accordingly, the excitation light distribution unit 110 outputs 200 W of excitation light power to each of the gain blocks 103-1 and 103-2.

Here, excitation light power outputted to the gain block 103-1 and that to the gain block 103-2 do not need to be the same. Required excitation light power may be different from gain block to gain block because of variability in characteristics of each gain block. For this reason, the node device control unit 104 may calculate respective levels of excitation light power to be outputted to the gain blocks also on the basis of information on amplification characteristics of the gain blocks used there, and may output the results to the excitation light distribution control unit 201.

Operation of the gain block 103-2 receiving excitation light power from the excitation light distribution unit 110 is the same as that of the gain block 103-1 already described above.

Further, operation in the gain block 103-2 of when, in addition to an optical signal of wavelength λ1 (lambda 1), an optical signal of wavelength λ2 (lambda 2) to be amplified by the same gain block is added is also the same as the corresponding operation already described above.

Using FIG. 3C, description will be given of operation of distributing excitation light further to the gain block 103-3 in addition to the gain blocks 103-1 and 103-2.

Assumed is a case where, in a situation the gain blocks 103-1 and 103-2 respectively amplify an optical signal of wavelength λ1 (lambda 1) inputted via the route #1 and that via the route #2, another optical signal of wavelength λ1 (lambda 1) is additionally inputted via the route #3 and received by the transponder 107-3. In this case, the gain block 103-3 comes to amplify the optical signal of wavelength λ1 (lambda 1) inputted via the route #3. Here, the wavelength of the optical signal inputted via the route #3 does not need to be λ1 (lambda 1), and may be another wavelength determined by the system.

The node device control unit 104 remembers, as connection setting information, that an optical signal inputted via the route #3 is to be connected to the transponder 107-3 via the transponder accommodation unit 120. From this connection setting information, the node device control unit 104 specifies that a gain block to be operated newly is the gain block 103-3. Then, in order to supply excitation light power to the specified gain block 103-3, the node device control unit 104 specifies to the excitation light distribution control unit 201 a port of the variable branching unit 102 from which the excitation light needs to be outputted, and calculates excitation light power required for amplification of the new optical signal by the gain block 103-3. Then, the node device control unit 104 notifies the excitation light distribution control unit 201 of information on the specified excitation light output port of the variable branching unit 102 and of the calculation result on the required excitation light power.

The excitation light distribution control unit 201 controls the excitation laser light source unit 101 and the variable branching unit 102 such that the predetermined excitation light power is outputted at the specified excitation light output port. The variable branching unit 102 controls respective branching ratios of the variable branching-ratio optical distributors 208-1 to 208-3 such that the excitation light power is outputted at the specified excitation light output port, using monitoring results on optical power by the photodetectors 204 for optical power monitoring.

In this case, the optical amplification system 100 is desired to be capable of supplying the predetermined excitation light power newly to the gain block 103-3 while keeping constant the excitation light power already having been being supplied to the gain blocks 103-1 and 103-2. For that purpose, the excitation light distribution unit 110 supplies predetermined excitation light power to the gain blocks 103-1 to 103-3 by controlling the excitation laser light source unit 101 and the variable branching unit 102.

More specifically, the excitation light distribution unit 110 monitors excitation light output power to each of the gain blocks within the variable branching unit 102, and thereby controls the excitation light power at the excitation laser light source unit 101 and the branching ratios in the variable branching unit 102.

FIG. 3C shows a case where excitation light is outputted to three gain blocks (the gain blocks 103-1 to 103-3). In FIG. 3C, it is assumed that, in the excitation light distribution control unit 201, the gain blocks 103-1, 103-2 and 103-3 are connected to output ports A, B and C of the variable branching unit 102, respectively. The excitation light distribution control unit 201 controls the optical distributors 208-1 to 208-3 to branch one-third of excitation light to each of the ports A, B and C.

Figure 11:
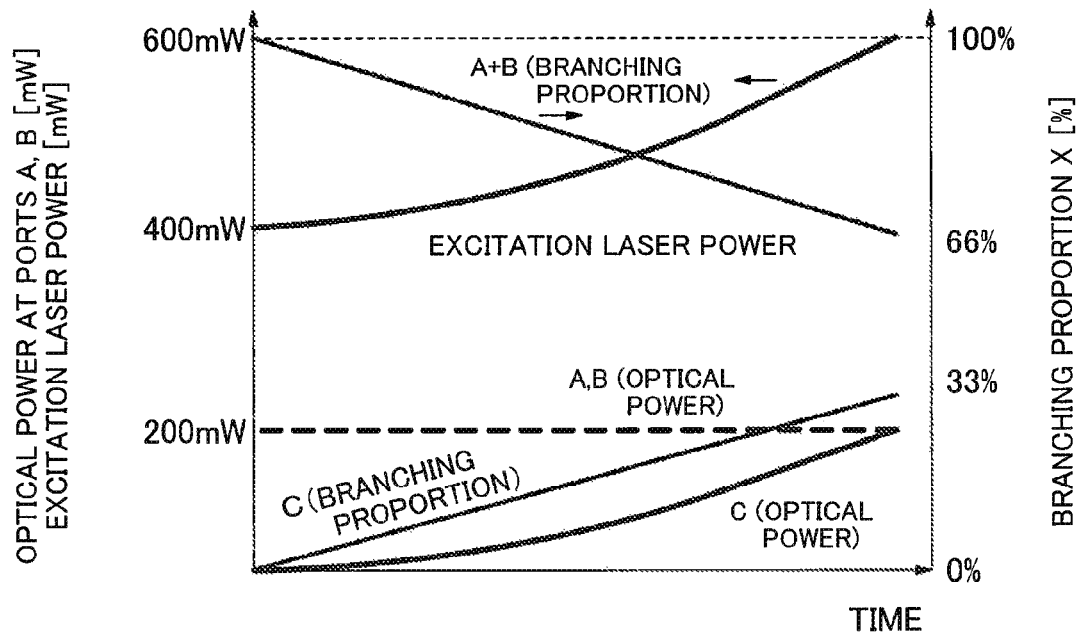
[FIG. 11] A diagram showing temporal variation of excitation light power values and of branching proportions of an optical distributor during addition of gain blocks

FIG. 11 is a diagram showing change of the excitation light and that of the branching ratio of the optical distributor 208-1 during a period of increasing the number of gain blocks in operation. In FIG. 11, when supplying excitation light power to the gain block 103-3, the excitation light distribution control unit 201 increases the excitation light power of the excitation laser light source unit 101 further than that in the case of FIG. 3B. At the same time, the excitation light distribution control unit 201 decreases the branching proportion of the optical distributor 208-1 to the side of the ports A and B and increases that to the side of the port C.

Here, the excitation light distribution control unit 201 changes the excitation light power of the excitation laser light source unit 101 and the branching ratio of the optical distributor 208-1, while keeping the product of the branching proportion of the optical distributor 208-1 to the side of the ports A and B and the excitation light power. By this way, excitation light power outputted from the port A and that from the port B are kept constant. As a result, it becomes possible to supply excitation light power newly to the gain block 103-3 without changing excitation light power supplied to the gain blocks 103-1 and 103-2. Here, because only the gain block 103-3 is connected to the optical distributor 208-3 via the port C, the optical distributor 208-3 may be set to 100% branch to the port C side.

Finally, as shown in FIG. 3C, the optical output of the excitation laser light source unit 101 is increased to 600 mW, and the branching ratio of the optical distributor 208-1 becomes 66% (A and B ports side): 33% (C port side). As a result, the excitation light distribution unit 110 outputs 200 mW of excitation light power to each of the gain blocks 103-1 to 103-3.

Here, as already described with regard to FIG. 3B, respective levels of excitation light power supplied to the gain blocks 103-1 to 103-3 do not need to be all the same. The node device control unit 104 may hold information about amplification characteristics of the gain blocks used there, calculate excitation light power to be outputted to each of the gain blocks also on the basis of the information, and output the calculation results to the excitation light distribution control unit 201.

Operation of the gain block 103-3 receiving excitation light power from the excitation light distribution unit 110 is the same as that of the gain blocks 103-1 and 103-2 already described above. Further, operation in the gain blocks 103-1 to 103-3 in case of, in addition to an optical signal of wavelength λ1 (lambda 1), an optical signal of wavelength λ2 (lambda 2) to be amplified by the same gain block is added is also the same as the corresponding operation already described above.

With the configurations and operations described above, the optical amplification system of the first exemplary embodiment can increase the excitation light power to a gain block for which the number of wavelengths is to be increased, while keeping constant the excitation light power to the gain block(s) in operation.

Here, in the optical amplification system of the first exemplary embodiment, it also becomes possible, in a case the number of wavelengths used by the gain block in operation decreases, to decrease only the excitation light power supplied to the gain block by controlling the branching ratios and the total excitation light power.

As has been described above, the optical amplification system of the first exemplary embodiment supplies excitation light outputted by the excitation light source to the plurality of gain blocks by distributing the excitation light to the gain blocks by the variable branching unit. Excitation light is supplied only to a gain block to perform amplification. The supplied excitation light power is determined according to the optical signal to be amplified at each gain block.

Accordingly, the optical amplification system of the first exemplary embodiment does not need to include an excitation light source for each gain block, and can reduce the number of arranged excitation light sources by integrating the excitation light sources. Also, by arranging excitation light sources in an integrated manner, power consumption of their control circuit can be reduced.

For example, in order to realize high-speed wavelength setting and switching, regardless of the presence or absence of an optical signal to be amplified, a temperature control function to stabilize oscillation wavelengths of excitation lasers of all optical amplifiers at respective predetermined wavelengths needs to be operated. Even in such a case, by arranging excitation light sources in an integrated manner, the optical amplification system of the first exemplary embodiment can reduce power consumption of a control circuit of the excitation light sources.

As a result, the optical amplification system of the first exemplary embodiment leads to the effect of reducing the cost and power consumption of an optical amplification system provided with optical amplifiers.

Further, in the optical amplification system of the first exemplary embodiment, each gain block comprises a variable optical attenuator, photodetectors and an individual gain block control unit. The individual gain block control unit changes excitation light power inputted to the gain block by the use of the VOA. By this way, the optical amplification system of the first exemplary embodiment leads to also the effect of making possible extremely fast AGC or ALC control within each gain block.

Here, the excitation light distribution control unit 201 and the individual gain block control unit 205 may each comprise a CPU (central processing unit) and a memory, and the CPU may perform the above-described control according to a program stored in the memory.

Next, it will be described that, in the first exemplary embodiment, the objective of the present invention can also be achieved by a configuration including only the excitation light distribution unit 110.

In FIG. 1, the excitation light distribution unit 110 includes the excitation laser light source unit 101, the variable branching unit 102 and the excitation light distribution control unit 201.

The excitation light distribution control unit 201 controls the excitation laser light source unit 101 and the variable branching unit 102, on the basis of information on the ports of the variable branching unit 102 to output excitation light inputted from the outside and of information on the power of excitation light. Specifically, the excitation light distribution control unit 201 controls the excitation laser light source unit 101 and the variable branching unit 102 such that the same power of excitation light as inputted power is outputted from a designated port of the variable branching unit 102.

By the operation of the variable branching unit 102 and the excitation light distribution control unit 201, the excitation light distribution unit 110 having the above-described configuration can supply excitation light only to a gain block which performs amplification. Further, by the operation of the excitation laser light source unit 101 and the excitation light distribution control unit 201, the excitation light distribution unit 110 can determine excitation light power to output on the basis of information on optical signals to be amplified in respective gain blocks.

As a result, by using the excitation light distribution unit 110, it becomes unnecessary to provide an exciting light source for each gain block in the optical amplification system, and the number of arranged excitation light source can thus be reduced by integrating the excitation light sources. By arranging excitation light sources in an integrated manner, power consumption of their control circuit can also be reduced.

That is, also by the configuration including only the excitation light distribution unit 110, the problem of reducing the cost and power consumption of an optical amplification system is solved.

[Second Exemplary Embodiment]

FIG. 4 is a diagram showing a configuration of an optical amplification system of a second exemplary embodiment of the present invention. The optical amplification system of the second exemplary embodiment includes blocks each comprising the gain blocks 103-1 to 103-n and the excitation light distribution unit 110 which have been described in the first exemplary embodiment, each of the blocks as a sub-amplification block 401. The sub-amplification blocks 401 are increased or decreased in number in accordance with the increase or decrease in the number of the transponders 402 or that of the transponder accommodation units 403, and the sub-amplification blocks are collectively controlled by the node device control unit 104. By combining the gain blocks 103-1 to 103-n and the excitation light distribution unit 110 into a sub-block, even when applied to a system including a large number of routes, the optical amplification system of the second exemplary embodiment can keep small the maximum excitation light power required of the excitation light source unit and the branch number of the variable branching unit.

As a result, the optical amplification system of the second exemplary embodiment leads to also the effect of keeping the cost low in accordance with system size, in addition to the effect of the optical amplification system of the first exemplary embodiment.

[Third Exemplary Embodiment]

FIG. 5 is a diagram showing a configuration of a third exemplary embodiment of an optical amplification system of the present invention. In the third exemplary embodiment, a plurality of routes #1 to #8 are each split further into four branches by respective couplers 501. Additionally, optical amplification systems 502 are each arranged between the couplers 501 and respective transponder accommodation units 505.

In FIG. 5, a total of eight couplers 501, one for each of the eight routes, are arranged. The optical amplification systems 502 are each arranged between the branching side of the couplers 501 and the respective transponder accommodation units 505. In FIG. 5, each optical amplification system 502 accommodates a total of eight ports consisting of one branching side port from each of the different eight 1×4 couplers.

Here, in the third exemplary embodiment, assumed is a configuration where the optical amplification systems 502 are each connected to respective ones of branching side ports of each of the couplers 501. However, in FIG. 5, for simplification of the diagram, illustrated is a configuration where one of the optical amplification systems 502, one of the transponder accommodation units 505 and transponders 506 are connected to only one of branching side ports of each of the couplers 501.

The optical amplification system 502 comprises an excitation light distribution unit 504 and eight gain blocks 503. Each of the gain blocks 503 has the same configuration and function as that of the gain block 103-1 described in FIG. 1. The excitation light distribution unit 504 controls excitation light power amounts supplied to respective ones of the gain blocks 503 according to information inputted from a node device control unit 507.

The transponder accommodation unit 505 separates, at each of wavelength, wavelength-multiplexed optical signals on the eight routes each of which is different one of the couplers 501 and are subsequently amplified in the respective gain blocks, and it also sets input-output optical paths such that the separated signals are each outputted to a predetermined transponder among the transponders 505.

In a case the optical amplification system 502 is arranged on the converging side of the couplers, if the optical amplification system gets out of order, communication with all transponders under the couplers 501 is influenced by the failure. However, by arranging the optical amplification system 502 on the branching side of the couplers, influence of the optical amplification system's failure upon the transponders side can be reduced compared to a configuration of arranging the optical amplification system 502 on the converging side of the couplers. It is because, when the optical amplification system 502 is arranged on the branching side of the couplers as in FIG. 5, the influence range of the optical amplification system's failure is limited to only transponders under the transponder accommodation unit 505.

Further, the configuration of comprising gain blocks as sub-blocks described in the second exemplary embodiment may be applied to the third exemplary embodiment. By this way, the optical amplification system of the third exemplary embodiment also leads to the effect of being able to keep the cost low according to device scale.

In the first to the third exemplary embodiments, description has been given of a configuration for receiving dropped wavelength-multiplexed signals via a plurality of routes in a ROADM node. However, the configurations of these exemplary embodiments may be applied to a configuration for adding a wavelength-multiplexed signal onto a transmission line. That is, an optical amplification system may be configured such that, when an optical signal transmitted by a transponder is added onto a transmission line via a transponder accommodation unit, the transponder accommodation unit amplifies an optical signal to transmit and outputs the amplified optical signal to a route. This configuration can be realized in the first to the third exemplary embodiments by configuring the first to the third exemplary embodiments such that a transponder accommodation unit receives and outputs an optical signal transmitted by a transponder, and then an optical amplification system amplifies and outputs the output signal to a route.

Description has been given above of the exemplary embodiments where the optical amplification system of the present invention is applied to a wavelength multiplexing communication system. However, in each of the exemplary embodiments, the number of wavelengths, of transmission lines and of routes, and the number of a transponder accommodation unit's accommodation are each an example for describing the exemplary embodiment, and a configuration of the present invention is not limited to the above-described exemplary embodiments. Also, a configuration of the ROADM node in the first to the third exemplary embodiments is not limited to the configuration using a multicast switch shown in Non-patent document 1.

Further, the application range of the above-described exemplary embodiments is not limited to a wavelength multiplexing communication system. The first to the third exemplary embodiments are applicable to a case where, while a large number of optical amplifiers are disposed, a total number of actually amplified wavelengths is small.

Here, part or the whole of the first and the second exemplary embodiments described above can also be described as, but is not limited to, the following supplementary notes.

(Supplementary Note 1)

An excitation light distribution device comprising an excitation light source output means for outputting excitation light, an optical branching means with variable branching ratio for branching and outputting the excitation light, and a control means for controlling, on the basis of information on an optical signal to be amplified by the excitation light outputted by the optical branching means, at least either the branching ratio of the optical branching means or the optical output power of the excitation light source output means.

(Supplementary Note 2)

The excitation light distribution device described in supplementary note 1, which is characterized by that the control means controls at least either the branching ratio of the optical branching means or optical output power of the excitation light source output means, on the basis of information on the number of optical signals to be amplified by the excitation light outputted by the optical branching means and on optical paths on which the optical signals are transmitted.

(Supplementary Note 3)

The excitation light distribution device described in supplementary notes 1 or 2, wherein the optical branching means comprises an excitation light monitoring means for monitoring the power of excitation light outputted from the optical branching means and for outputting an excitation light monitoring signal corresponding to the intensity of the excitation light, and, on the basis of the excitation light monitoring signal, the control means controls the power of excitation light outputted by the excitation light source output means and the branching ratio of the optical branching means.

(Supplementary Note 4)

An optical amplification system comprising the excitation light distribution device described in any one of supplementary notes 1 to 3, and an amplification means for amplifying and outputting said optical signal by inputting an optical signal and excitation light outputted from the excitation light distribution device, amplifies and outputs the optical signal.

(Supplementary Note 5)

The optical amplification system described in supplementary note 4, wherein the amplification means is disposed on each optical path transmitting an optical signal.

(Supplementary Note 6)

The optical amplification system described in supplementary notes 4 or 5, further comprising an optical attenuation means for attenuating the intensity of excitation light inputted to the amplification means, and a gain block control means for controlling the attenuation amount of the optical attenuation means.

(Supplementary Note 7)

The optical amplification system described in any one of supplementary notes 4 to 6, further comprising an optical signal monitoring means for monitoring the intensity of an optical signal in output of the amplification means and for outputting an optical monitoring signal corresponding to the intensity of the optical signal, wherein the gain block control means controls the attenuation amount of the optical attenuation means on the basis of the optical monitoring signal.

(Supplementary Note 8)

A node device comprising the optical amplification system described in any one of supplementary notes 4 to 7 which amplifies an inputted optical signal, and a transponder accommodation means for separating the optical signal amplified by the optical amplification system at each wavelength and for outputting the separated signals onto respective predetermined optical paths.

(Supplementary Note 9)

A node device comprising a transponder accommodation means for combining optical signals outputted from an optical transmission means into a wavelength-multiplexed signal and for outputting the optical signals to a predetermined optical path, and the optical amplification system described in any one of supplementary notes 4 to 7 which amplifies the optical signal outputted to the predetermined optical path.

(Supplementary Note 10)

An excitation light distribution method which comprises branching and outputting excitation light and, on the basis of information on an optical signal to be amplified by the branched and outputted excitation light, controlling at least either the branching ratio of the excitation light or the optical output power of the excitation light.

(Supplementary Note 11)

A program of an excitation light distribution device, the program for causing a computer of the excitation light distribution device to control a control means which controls at least either the optical output power of an excitation light source output means for outputting excitation light or the branching ratio of an optical branching means with variable branching ratio for branching and outputting the excitation light, on the basis of information on an optical signal to be amplified by the excitation light.

The present invention has been described above with reference to the exemplary embodiments, but the present invention is not limited to the above-described exemplary embodiments. In configurations and details of the present invention, various changes which are understood by those skilled in the art can be made within the scope of the present invention.

This application is based upon and claims the benefit of priority from Japanese Patent Application No. 2010-237609 applied on Oct. 22, 2010, the disclosure of which is incorporated herein in its entirety by reference.

REFERENCE SIGNS LIST 100 optical amplification system
101 excitation laser light source unit
102 variable branching unit
103-1 to 103-n gain block unit
104 node device control unit
107-1 to 107-m transponder
110 excitation light source distribution unit
120 transponder accommodation unit
201 excitation light distribution control unit
203 variable optical attenuator (VOA)
204, 214 photodetector
205 individual gain block control unit
206 active fiber
207 isolator
208-1 to 208-3 variable branching ratio optical distributor
209 optical coupler
401 sub-amplification block
402 transponder
403 transponder accommodation unit
501 coupler
502 optical amplification system
503 gain block
504 excitation light distribution unit
505 transponder accommodation unit
506 transponder
507 node device control unit
601, 603, 604 ROADM node
602 optical fiber transmission line
606 transponder
701, 711 transmission line
721, 722 transponder accommodation unit
723 wavelength path-line add/drop unit
732 control unit
751 transponder
761, 771 route
801-1 to 801-4 1×4 splitter
802-1 to 802-4 4×1 switch
803-1 to 803-4 variable wavelength filter
804-1 to 804-4 transponder
805 multicast switch
806 transponder accommodation unit
907-1 to 907-4 optical amplifier

What is claimed is:

1. An excitation light distribution device comprising:
   an excitation light source output unit that outputs excitation light;
   an optical branching unit with variable branching ratio that branches and outputs said excitation light; and
   a control unit that controls, on the basis of information on an optical signal to be amplified by the excitation light outputted by said optical branching unit, at least either the branching ratio of said optical branching unit or the optical output power of said excitation light source output unit.

2. The excitation light distribution device according to claim 1, wherein
   said control unit controls at least either the branching ratio of said optical branching unit or the optical output power of said excitation light source output unit, on the basis of information on the number of optical signals to be amplified by the excitation light outputted by said optical branching unit and on optical paths on which said optical signals are transmitted.

3. The excitation light distribution device according to claim 1, wherein:
   said optical branching unit comprises an excitation light monitoring unit that monitors the power of said excitation light outputted from said optical branching unit and that outputs an excitation light monitoring signal corresponding to the intensity of said excitation light; and,
   on the basis of said excitation light monitoring signal, said control unit controls the power of said excitation light outputted by said excitation light source output unit and the branching ratio of said optical branching unit.

4. An optical amplification system comprising:
   the excitation light distribution device according to claim 1; and
   an amplification unit that amplifies and outputs said optical signal by inputting an optical signal and excitation light outputted from said excitation light distribution device.

5. The optical amplification system according to claim 4, wherein said amplification unit is disposed on each optical path transmitting said optical signal.

6. The optical amplification system according to claim 4, further comprising:
   an optical attenuation unit that attenuates the intensity of said excitation light inputted to said amplification unit; and
   a gain block control unit that controls the attenuation amount of said optical attenuation unit.

7. The optical amplification system according to claim 6, further comprising:

an optical signal monitoring unit that monitors the intensity of said optical signal in output of said amplification unit and that outputs an optical monitoring signal corresponding to the intensity of said optical signal, wherein said gain block control unit controls the attenuation amount of said optical attenuation unit on the basis of said optical monitoring signal.

8. A node device comprising:

the optical amplification system according to claim 4 which amplifies an inputted optical signal; and a transponder accommodation unit that separates said optical signal amplified by said optical amplification system at each wavelength and that outputs the separated signals onto respective predetermined optical paths.

9. A node device comprising:

a transponder accommodation unit that combines optical signals outputted from an optical transmission unit into a wavelength-multiplexed signal and for outputting said optical signals to a predetermined optical path; and the optical amplification system according to claim 4 which amplifies said optical signal outputted to said predetermined optical path.

10. An excitation light distribution method which comprises:

branching and outputting excitation light; and, on the basis of information on an optical signal to be amplified by said branched and outputted excitation light, controlling at least either the branching ratio of said excitation light or the optical output power of said excitation light.

* * * * *